W. R. MICHENER,

Assignor to AMES IRON WORKS.

Portable Steam-Boiler.

No. 9,149. Reissued April 13, 1880.

WITNESSES:

E. Laass,

John. Morgan.

INVENTOR:

William R. Michener, per Dull, Laass & Hopf, attorneys.

N. PETERS, PHOTO-LITHOGRAPHER, WASHINGTON, D. C.

UNITED STATES PATENT OFFICE.

WILLIAM R. MICHENER, OF OSWEGO, NEW YORK, ASSIGNOR TO AMES IRON WORKS, OF SAME PLACE.

PORTABLE STEAM-BOILER.

SPECIFICATION forming part of Reissued Letters Patent No. 9,149, dated April 13, 1880.

Original No. 193,378, dated July 24, 1877. Application for reissue filed December 15, 1879.

*To all whom it may concern:*

Be it known that I, WILLIAM R. MICHENER, of the city of Oswego, in the county of Oswego and State of New York, have invented a certain new and useful Improvement in Portable Boilers; and I do hereby declare the following, taken in connection with the accompanying drawings, to be such a full, clear, and exact description of the same as to enable any person skilled in the art to which it appertains to make and use the same.

This invention relates to improvements in the class of steam-boilers termed "portable," and has, more particularly, reference to that style of boilers in which the fire-arch or main flue is extended longitudinally through the boiler.

The invention consists, essentially, in joining to the bottom of the interior of the main shell of the boiler the side walls of the main fire-flue, and making the bottom section of the former serve both as a bottom of the latter and as a tie to the crescent-shaped boiler formed around the said main flue, by which improvement the construction of the boiler is simplified and the efficiency of the boiler enhanced.

It also consists in a novel, simple, and effective means of staying that portion of said boiler which is weakened by the necessary opening for the reception of the fire-grate and ash-pan, all as hereinafter more specifically set forth and described.

Figure 1:
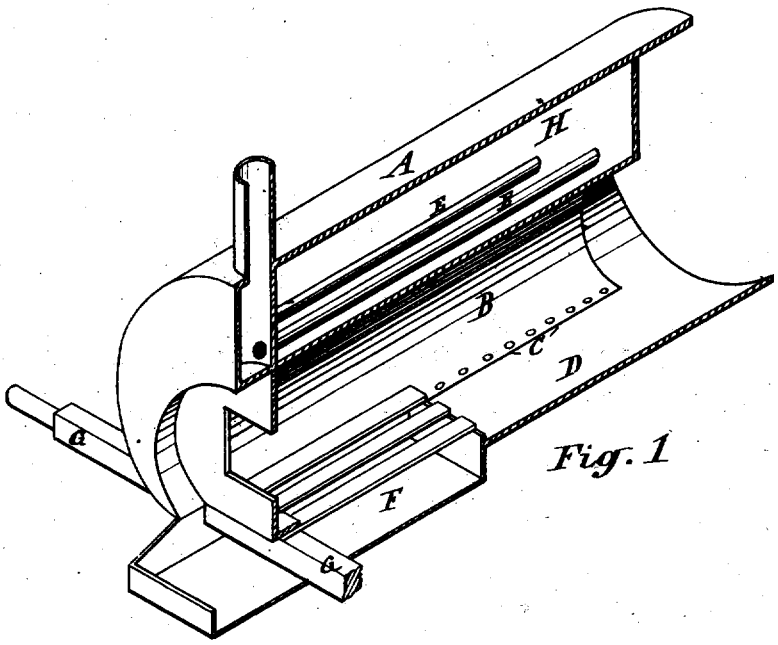
Figure 2:
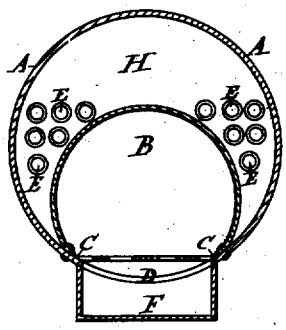

In the accompanying drawings, Figure 1 is an isometric projection of a longitudinal section of my improved boiler, and Fig. 2 a transverse section of same.

Similar letters of reference indicate corresponding parts.

A represents the main shell of the boiler, made cylindric in form. B denotes the main fire-flue extended the length of the boiler, and formed of a sheet bent concavo-convex or segmental in cross-section, and riveted at its longitudinal edges to the lower portion of the main shell along the lines indicated by C. The boiler proper, H, is thus made crescent-shaped in cross-section, and the bottom D of the outer or main shell thereof, which is isolated from the water and steam of the boiler by the junction of the two sheets A and B, as aforesaid, is thereby made to constitute the bottom of the main fire-flue, and at the same time serve as a tie for the bottom of the crescent-shaped boiler.

By placing the fire-flue B as low as possible in the boiler, in the manner described and shown, the room below the water-line of the boiler is rendered more capacious to admit of a greater number of return-flues E, allowing them to be arranged above the main flue, as well as at the sides thereof, and thus increasing the heating-surface and the consequent efficiency of the boiler.

It having been proved that but very little heat radiates from the bottom of the fire-flue, the deprivation of the water-space, which in ordinary construction of this class of boilers is formed around the bottom of said flue, is more than compensated by the increased number of return-flues.

By the accumulation of ashes and cinders upon the bottom D of the main flue the same is protected from the fire.

It will be observed that by joining the two sheets A and B at C in the manner described and shown a saving of material is accomplished and cost of construction reduced.

At the front end of the boiler a portion of the bottom D is cut away to form an opening for the reception of the fire-grate and its subjacent ash-pan F. The sides of the ash-pan may be made double, if desired, to form a water-space communicating with the boiler. A shaft, axle, or stay, G, is secured across the aforesaid opening, so as to counteract the weakening caused by cutting away the shell.

Having thus described my invention, what I claim as new, and desire to secure by Letters Patent, is—

1. A steam-boiler composed of a cylindrical main shell, a segmental main-flue shell extended the length of the boiler proper and joined at its bottom edges to the lower portion of the interior of the main shell, two crescent-shaped flue-sheets, respectively, at opposite ends of the boiler proper, and return-flues arranged between the vertical sides of the two shells, substantially as described and shown.

2. A return-flue boiler having a main flue extended the length thereof, and composed of a shell of segmental form in cross-section, joined at its longitudinal edges to the lower portion of the interior of the cylindrical main shell of the boiler, and having the bottom portion of the latter constitute the bottom of the main flue aforesaid.

3. In combination with the crescent-shaped boiler H, having in an opening in its bottom the fire-grate and the subjacent ash-pan F, the axle G, extended across said opening and rigidly secured to the lower extremities of the crescent shell, substantially as described and shown.

4. In combination with the segmental shell B, riveted to the shell A, as shown, and having in the bottom thereof the opening D for the reception of the grate and ash-pan F, the shaft or axle G, secured across said opening and serving as a stay, substantially as described and set forth.

In testimony that I claim the foregoing I have hereunto set my hand in presence of two attesting witnesses at Syracuse, New York, this 17th day of November, A. D. 1879.

W. R. MICHENER.

Witnesses:

K. L. HEY,

GEORGE W. HEY.